United States Patent [19]

Wiart et al.

[11] 4,072,882
[45] Feb. 7, 1978

[54] FREQUENCY CURRENT CONVERTER FOR ENERGIZING AN AC MACHINE

[75] Inventors: Albert Charles Wiart, Sannois; Pierre Jacques de la Jonquiere, Fontainebleau, both of France

[73] Assignee: Jeumont-Schneider, Puteaux, France

[21] Appl. No.: 694,493

[22] Filed: June 10, 1976

[30] Foreign Application Priority Data

June 16, 1975    France .................... 75 18861

[51] Int. Cl.² ........................................ H02P 7/62
[52] U.S. Cl. ............................... 318/227; 363/138
[58] Field of Search ............... 321/45 C; 318/138, 227, 318/245 C, 255 G, 254

[56] References Cited

U.S. PATENT DOCUMENTS

| | | | |
|---|---|---|---|
| 3,406,325 | 10/1968 | Rosa | 318/227 X |
| 3,444,451 | 5/1969 | Schlabach et al. | 318/227 |
| 3,612,973 | 10/1971 | Kuniyoshi | 321/45 C |
| 3,781,644 | 12/1973 | Yatsuk | 321/45 C |
| 3,924,173 | 12/1975 | Goswami | 321/45 C X |

*Primary Examiner*—William M. Shoop
*Attorney, Agent, or Firm*—C. M. Lorin

[57] ABSTRACT

An adjustable current input inverter-induction motor drive using a commutation bridge associated with a common commutating capacitor and four commutating thyristors. Capacitive means is provided for transferring energy during commutation from one main thyristor branch to the next in sequence through the inverter, and a capacitor inputting in a transformer and full wave rectifier bridge is provided coupled to said capacitive means for recuperating excess energy and for restitution thereof into the DC link of the inverter.

13 Claims, 3 Drawing Figures

FREQUENCY CURRENT CONVERTER FOR ENERGIZING AN AC MACHINE

BACKGROUND OF THE INVENTION

The invention relates in general to motor drives and in particular to traction motors.

The present invention relates to a variable frequency current converter for energizing an alternating current machine (or motor) from a controllable direct current power supply in order to enable the said machine to function at a controllable speed and with a controllable torque.

When so energized at variable frequency and voltage the AC motor operates with characteristic which is nearly the same as of a DC machine, without the drawback of a commutator.

In French Pat. Nos. 2,161,162 dated Nov. 16, 1971, and 2,194,346 dated Sept. 25, 1972, both of Albert Wiart, are described adjustable speed induction motor drives involving a direct current power source and thyristor switches but requiring the use of current choppers.

The object of the present invention is to make the use of a chopper optional and to provide apparatus requiring fewer components, thus less costly.

It is known to use capacitors for storing the energy employed in the commutation circuits, but such capacitors must operate at a fixed voltage.

Another object of the invention is to enable the use of capacitors with a variable voltage across the terminals.

SUMMARY OF THE INVENTION

The invention relates to a variable frequency current converter for supplying AC current to n phases from a variable current DC source, including an inductor.

The converter according to the invention comprises: (1) a switching bridge including: n pairs of main thyristors located in n parallel branches, the junction points between the thyristors of a pair in each branch being connected to n respective phase terminals of the AC machine, the main thyristors being such as to pass, each in its turn, DC current from the power source; (2) a commutation bridge comprising n pairs of diodes connected in series in n parallel branches, the junction points between diodes of a pair in each branch being connected to n respective phase terminals of the AC machine; (3) two commutation circuits for commutation of said main thyristors, each comprising a commutating capacitor inserted between two commutation thyristors, the first commutation circuit being connected between one end, (e.g. the common point of the anodes of the main thyristors) of said switching bridge and one end (e.g. the common point of the anodes of the diodes) of said commutation bridge, the second commutation circuit being connected between the other end (e.g. the common point of the cathodes of the main thyristors) of said switching bridge and the other end (e.g. the common point of the cathodes of the diodes) of said commutation bridge, the commutation capacitor being common to both commutation circuits.

Also, according to the present invention, (4) a capacitive circuit is provided connected the two ends of said commutation bridge to ensure progressive transfer of DC current from said commutation bridge to said switching bridge; and (5) a discharging circuit is provided for said capacitive circuit with transfer of the discharging energy into the direct link of the AC machine.

Moreover, the variable frequency current converter according to the invention includes a control logic for sequentially and cyclically switching said main thyristor and said commutation thyristors at a controllable repetitive rate, the controllable DC current from the DC link being outputted through the windings of the n phases of the AC machine.

In a specific embodiment of the invention, said discharging circuit includes a full wave rectifier mounted in series with the switching bridge having its AC terminals connected to the secondary winding of a transformer, the primary winding thereof being connected in series with an auxiliary capacitor.

DETAILED DESCRIPTION OF THE INVENTION

Figure 1:
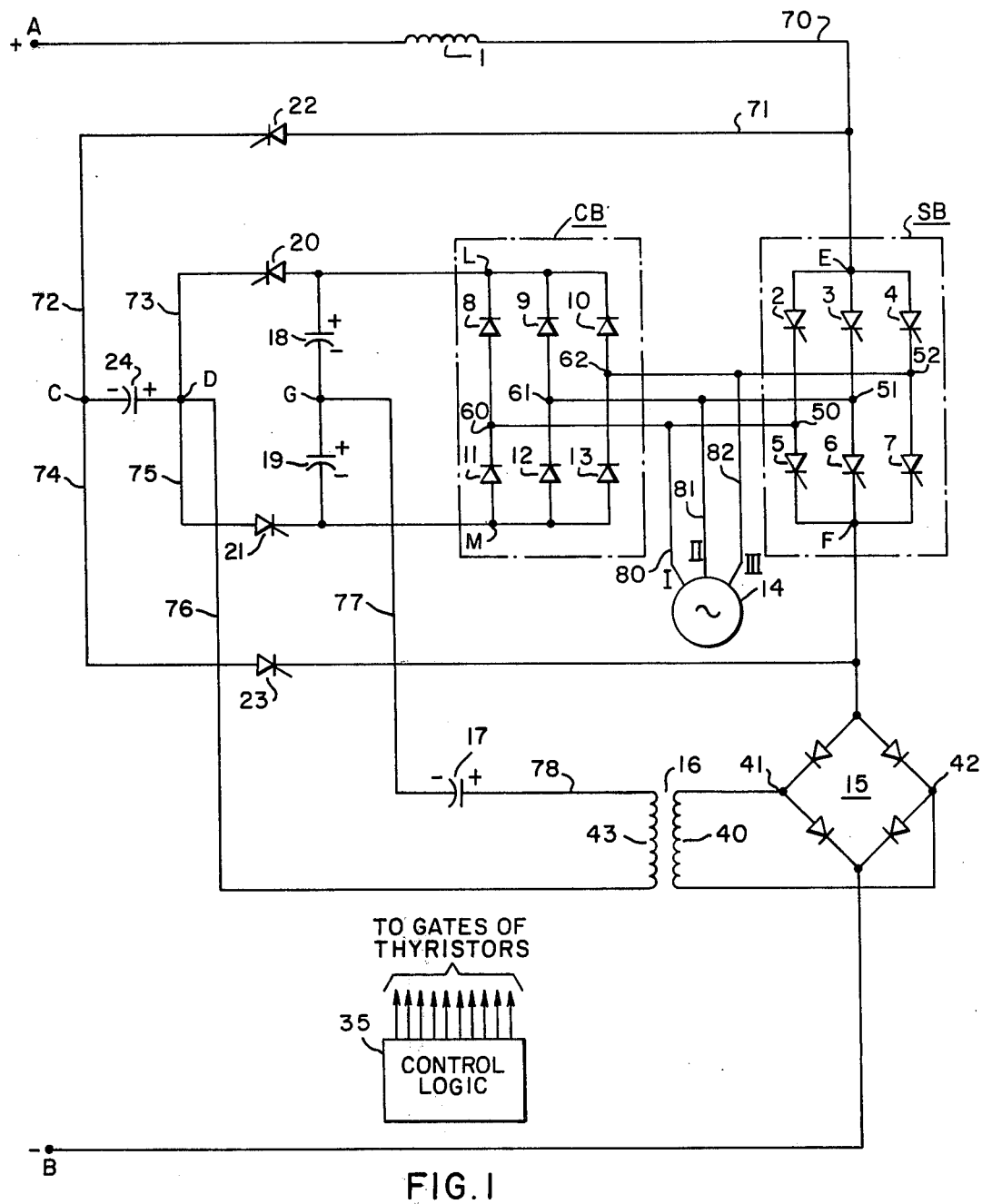
FIG. 1 shows the variable frequency converter according to the invention in a preferred embodiment.
Figure 2:
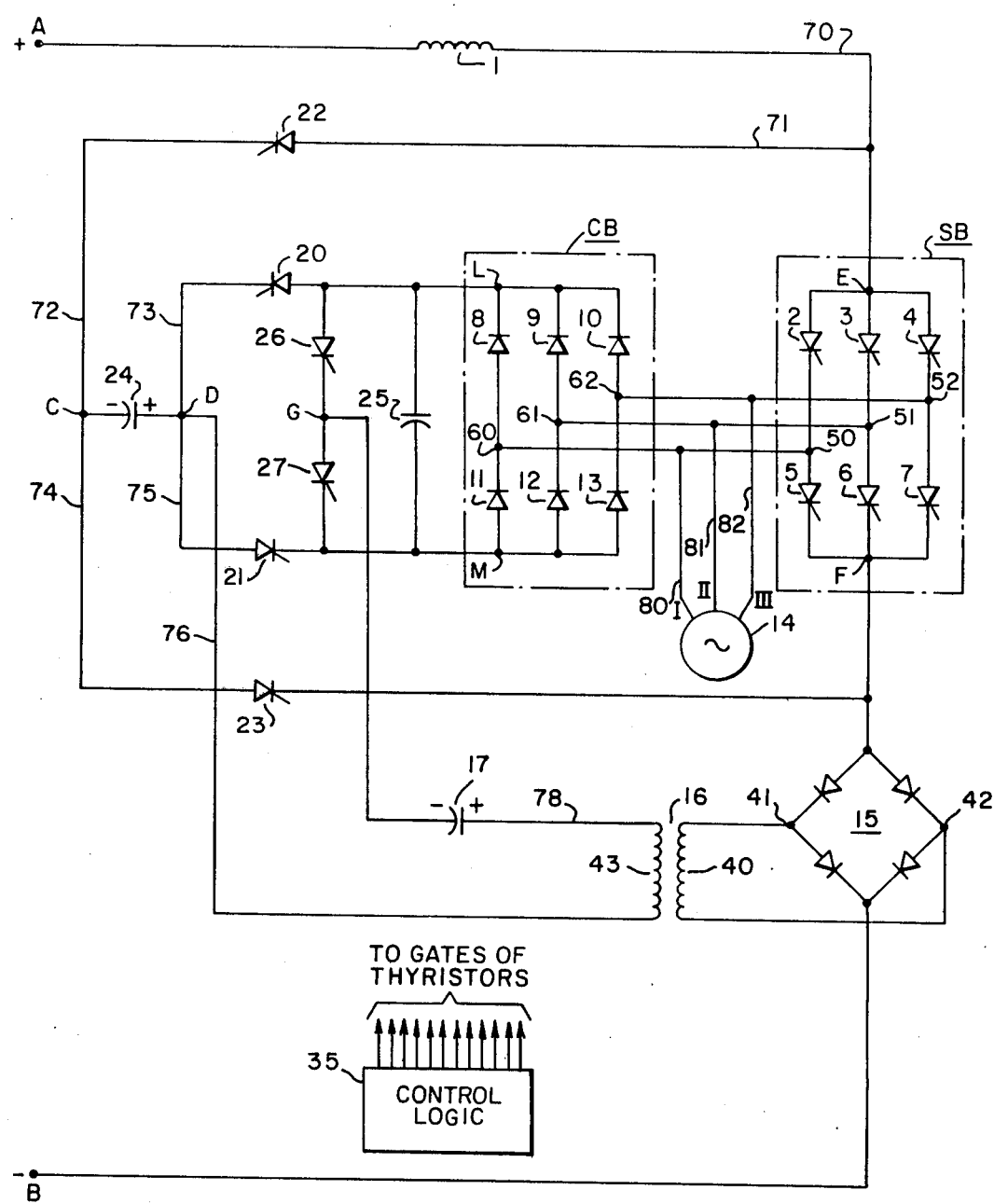
FIG. 2 shows another embodiment of the invention.

In the embodiments of FIGS. 1 and 2, a capacitive circuit is used for storing the commutation energy of the circuits, and a transformer is coupled with a full wave rectifier in order to transfer the stored energy to the DC link of the motor. These two FIGS. differ only in the specific arrangement of the capacitive circuit.

Figure 3:
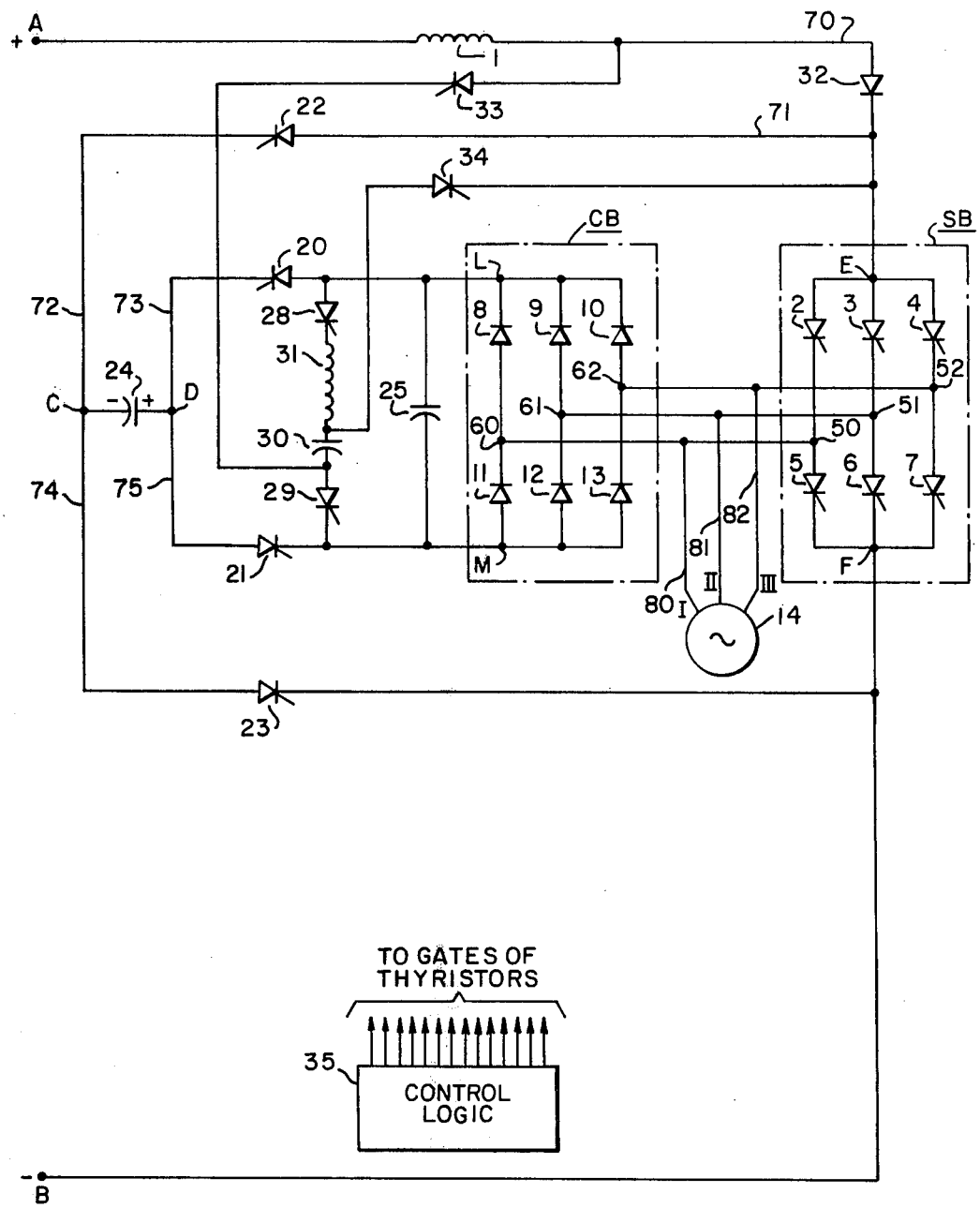
FIG. 3 shows a third embodiment of the invention.

In the embodiment of FIG. 3, still another type of capacitive circuit is used and the stored energy is transferred to the DC link energizing the rotor of the AC machine by a circuit combining an oscillatory circuit and auxiliary thyristors.

Referring to FIG. 1, between the A (+ve) and B (−ve) terminals of a controllable DC current source, the following circuits are connected in series:

a. a smoothing inductance 1;

b. a six thyristor bridge SB called hereafter a "switching bridge". The switching bridge includes three pairs of main thyristors (8, 11), (9, 12) and (10, 13) connected in series in parallel branches. The junction points 50, 51, 52 between main thyristors in each branch are connected to the lines 80, 81, 82 and the corresponding phases I, II, III of a 3-phase motor 14;

c. a full wave rectifier 15 whose alternating current terminals 41, 41 are connected to one winding 40 of a transformer 16;

d. a bridge CB of six diodes called "commutation bridge" and consisting of three pairs of diodes in series (8, 11), (9, 12) and (10, 13) withing parallel branches thereof. The junction points 60, 61, 62 of each pair of diodes are connected to lines 80, 81, 82 and the corresponding phases I, II, III of motor 14.

The commutating circuit includes a first auxiliary branch consisting of two thyristors 20 and 21 connected in series between the common end L of the cathoes of diodes 8, 9, 10 and the common end M of the anodes of diodes 11, 12, 13. Thyristos 20 and 21 are antiparallel with respect to the associated commutation diodes.

This first auxiliary branch is shunted by two capacitors 18 and 19 connected in series.

The commutating circuit also includes a second auxiliary branch consisting of two thyristos 22 and 23 connected in series between the common end E of the anodes of main thyristos 2, 3, 4 and the common end F of the cathooes of main thyristos 5, 6, 7. Thyristors 22 and 23 are connected in the same direction as those of the commutation bridge CB.

A commutation capacitor 24 connects the midpoints C and D of the said first and second auxiliary branches, and two capacitors in series 18, 19 are mounted in parallel between ends L, M of commutation bridge CB.

The other winding 43 of transformer 16 is connected in series with a capacitor 17 to form a network connecting point D of the first auxiliary branch 20, 21 and the junction point G between capacitors 18 and 19.

As generally known, a control logic 35 is provided to control the firing sequence of the various thyristors to determine ON and OFF cycles of the said thyristors in accordance with the operative mode described hereinafter.

DC current of a predetermined value is cycically passed through the phase windings of said motor 14 in such a way that, at any instant, DC current enters via one of terminals 80, 81, 82 (corresponding to the respective phases I, II,II of the motor) and only leave via one of the other two terminals (except during the very short commutation periods from one terminal to another, when current may concurrently pass for a short while through two terminals). The three terminals are used sequentially during each cycle in such a way that the operative periods of the various phase windings have equal duration. In each phase winding of the motor, an AC square-wave is generated while the current remains essentially constant in inductance 1. The function of this inductance is to oppose any variation in the current once the latter has been adjusted to a specified value.

In the current converter of FIG. 1, capacitors 18, 19 and 24 are initially charged in such a way that commutation capacitor 24 when charged has its electrode on the right side, at D, with a positive polarity, and capacitor 17 is charged so that its bottom electrode, e.g., connected via line 78 to transformer winding 43, has a positive polarity.

It will be assumed that main thyristor 2 is conducting so that the current enters line 80 via phase I, and that main thyristor 7 is conducting so that current leaves via line 82 and phase III. At a given instant, the current is to be switched from phase I via main thyristor 2 to phase II via main thyristor 3.

Thyristor 3 is fired and, at the same time, 2 is turned off when triggering commutation thyristors 22 and 21. Because the right electrode of capacitor 24 has a positive polarity, it applies via diode 11, to the cathode of main thyristor 2 a higher voltage than to its anode and, as a result, main thyristor 2 is turned off. Capacitor 24 discharges and recharges in the opposite sense due to the current from the motor passing therethrough as soon as the voltage across terminals CD is equal to the voltage of the capacitor pair 18, 19. The current from the motor thus flows via main thyristor 3 and, on the one hand, via diode 9, capacitors 18, 19, the circuit comprising capacitor 17, winding 43 of transformer 16 and commutation thyristor 21 to the terminal of 19, discussed hereinafter, diode 11 and phase I to line 80, on the other hand, via terminal II. This current, which remains constant in phase III, due to the presence of inductance 1, commutes from phase I (where it decreases) to phase II (where it increases) on account of the difference in potential fixed between 80 and 81 by the drop in voltage at the terminals of the capacitor pair 18, 19.

While main thyristor 2 is being turned off along with the commutation of the current from phase I to phase Ii, the energy stored in capacitor 19 during the preceding commutation is recuperated while capacitor 18 is being charged. In effect, upon triggering of commutation thyristor 21, a constant current concurrently due to the discharge of capacitor 19 and the charge of capacitor 18 circulates through the circuit of capacitor 17, winding 43 of transformer 16, and commutation thyristor 21. This is fixed through the transformer 16 by the total DC current leaving the motor and going throughthe full wave rectifier unit 15. The later rectifies the current pulses provided alternately in each direction by the transformer 16 during each commutation. Capacitor 17 discharges and recharges in opposite directions until the voltage across its terminals is equal to that of condenser 19. The current thus cancels itself out in the circuit, and capacitor 17 becomes suitably charged for a subsequent recovery of energy.

During the subsequent commutation, the process of commutation and recuperation is the same. Commutation occurs from phase III via main thyristor 7 to phase I via main thyristor 5, when main thyristor 5 is being fixed together with commutation thyristors 20 and 23. Capacitor 24, which had been charged in the opposite direction during commutation from main thyristor 2 to main thyristor 3, has thus been plalced automatically in the charge condition required for commutation from main thyristor 7 to main thyristor 5.

Referring to FIG. 2, circuit components similar to those illustrated in FIG. 1 have been designated by the same numeral references. Instead of the two capacitors 18, 19 of FIG. 1, a single capacitor 25 is used together with two series-connected thyristors 26 and 27 in parallel to capacitor 25. The anode of thyristor 26 is connected to the anode of commutation thyristor 20. The cathode of thyristor 27 is connected to the cathode of commutation thyristor 21. Capacitor 17 is no longer connected to the junction point of capacitors 18 and 19, as in FIG. 1, but rather is connected to the junction point of thyristors 26 and 27.

Although in the instance of FIG. 2, commutation occurs substantially in the same manner as in FIG. 1, capacitor 25 is the one which is initially charged prior to starting-up the converter.

In order to recover the energy of each commutation, it is necessary to trigger thyristor 26 at the same time as thyristor 21, or 27 at the same time as commutation thyristor 20. Part of the commutation current, instead of charging condenser 25 and then being recovered, travels directly into the recuperation circuit: 26, 17, 16, 21 or 20, 16, 17, 27.

Referring to FIG. 3, like circuit components have received the same reference numerals as in FIG. 2. Here, instead of components 15, 16, 17, 26 and 27, a series network consisting of thyristor 28, inductor 31, capacitor 30 and thyristor 29 is used replacing thyristors 26 and 27.

Also, an auxiliary diode 32 is inserted between inductor 1 and the switching bridge SB. The terminals of capacitor 30 are respectively connected to auxiliary diode 32 via thyristors 33 and 34. The anodeof thyristor 33 is connected to the anode of auxiliary dioe 32. The cathode of thyristor 34 is connected to the cathode of auxiliary diode 32. The cathode of thyristor 33 is connected to the anode of thyristor 29.

The energy of commutation stored in capacitor 25 is transmitted to the energizing circuit of the motor, by the operation of the series-type oscillating circuit 30-31 whose capacitor 30 discharges at the terminals of diode 32.

Thyristors 28 and 29 are triggered so as to charge capacitor 30 up to twice the voltage of capacitor 25, due to operation of oscillating circuit 30-31. When thyristos 28, 29 are turned of, thyristors 33 and 34 are turned on.

Thereafter, capacitor 30 supplis a reverse voltage to block auxiliary diode 32. Direct current from inductor 1 no longer passes through diode 32 but rather bypasses it via thyristor 33, capacitor 30 and thyristor 34. When capacitor 30 has been discharged, thyristor 33 and 34 are being turned off and direct current again passes through diode 32. Capacitor can be charged again for the subsequent cycle. Firing of thyristors 28 and 29 is synchronized with the commutation steps.

It appears that charging of capacitor 25 of FIGS. 2 and 3, or of capacitors 18, 19 of FIG. 1 reaches at least the counter electromotive force of motor 14 so that charging is automatically adjusted to match the current of the motor. Discharging of the said capacitors operates under constant current, since the capacitor voltage is added in series to the direct current link of the motor.

The invention is applicable to motor drives in general, and in particular to traction motors.

What we claim:

1. A variable frequency current converter for energizing an alternating current polyphase motor from an adjustable direct current source comprising:
    a direct current power supply;
    a current-fed inverter responsive to said direct current power supply including a plurality of paired main thyristors mounted in a bridge between corresponding phases of said motor and two pole terminals;
    a commutation bridge including a plurality of paired diodes mounted in a bridge between corresponding phases of said motor and two commutation poles;
    a common commutation capacitor operatively controlled concurrently with firing of an on-coming one of said paired main thyristors for turning off and off-going one of said paired main thyristors, said on-coming and off-going main thyristors being associated with a common one of said pole terminals and the commutation process being caused by said commutation capacitor through one of said paired diodes of said commutation bridge associated with the one of said commutation poles opposite to said one pole terminal;
    with capacitor means connected between said commutation poles and charged during the commutation process for transferring energy from the motor phase related to said off-going main thyristor to the motor phase related to said on-coming main thyristor via said one diode of said commutation bridge.

2. The converter of claim 1 including means connected to said capacitor means for restituting energy accumulated in said capacitor means to said direct current power supply.

3. The converter of claim 2, in which said capacitor means includes (a) two capacitors in series about a junction point, and said energy restituting means includes an auxiliary capacitor connected to said junction point and (b) a transformer having a primary winding coupled to said auxiliary capacitor and a secondary winding coupled to said direct current power supply.

4. The converter of claim 2, in which said capacitor means includes an additional capacitor mounted between said commutation poles; and said energy restituting means includes (a) two auxiliary thyristors mounted in series about a junction point and between said commutation poles, (b) an auxiliary thyristors and (c) a transformer having a primary winding coupld to said auxiliary capacitor and a secondary winding coupled to said direct current power supply.

5. The converter of claim 2, in which said capacitor means includes an additional capacitor mounted between said commutation poles; and said energy restituting means includes (a) two auxiliary thyristors connected in series about a junction point and mounted between said commutation poles, (b) an inductor-capacitor resonant network connected in series about said junction point of said auxiliary thyristors and between said auxiliary thyristors, (c) an auxiliary dioe interposed between one pole of said current inverter and said direct current power supply in the forward direction, and (d) a reverse-oriented thyristor connected between said junction point of said series resonant network and said auxiliary diode to switch said auxiliary diode into a blocking state during energy restitution by said energy restituting means.

6. A current-fed inverter for supplying variable frequency alternating current to an n phase motor from an adjustable direct current source comprising:
    a. a switching bridge for selectively passing said direct current to 2n main thyristors mounted by pairs in n parallel branches, each pair of thyristors having a junction point connected to a corresponding phase of said motor,
    b. a commutation bridgeincluding 2n commutation diodes mounted by pairs in n parallel branches, each pair of commutation diodes having a junction point connected to a corresponding phase of said motor,
    c. two commutation circuits for said main thyristors, said commutation circuits having in common a commutation capacitor, each commutation circuit including two commutation thyristors, one commutation thyristor of a commutation circuit being associated with a point common to the n main thyristors of one polarity, the other commutation thyristor of the same commutation circuit being associated with a point common to the n commutation diodes of the same polarity, said commutation capacitor being connected between two commutation thyristos of a commutation circuit, one of said commutation circuits being connected between the point common to the anodes of said main thyristors in said switching bridge and the point common to the anodes of said commutation diodes in said commutation bridge, the other of said commutation circuits being connected between the common point of the cathodes of said main thyristors in said switching bridge and the common point of the cathodes of said commutation diodes in said commutation bridge, two of said commutation thyristors in the respective commutation circuits being associated with one terminal of said commutation capacitor and with respective ones of said points common to the n main thyristors for each polarity, and two of said commutation thyristors in the respective commutation circuits being associated with the other terminal of said commutation capacitor and with respective ones of said points common to the n commutation diodes for each polarity.

7. The current-fed inverter of claim 6 with capacitive means connected between the poles of said commutation bridge to ensure the progressive transfer of the direct current from said commutation bridge to said switching bridge.

8. The current-fed inverter of claim 7 with means for discharging said capacitive means and for transferring the discharged energy from said capacitive means to said source.

9. The current-fed inverter of claim 8 with control means for cyclically and sequentially switching said main thyristors and said commutation circuits at a controllable repetitive rate to pass said adjustable DC current from said source through the n phases of said motor at said repetitive rate.

10. The current-fed inverter of claim 9 comprising a transformer and in series with said switching bridge a full wave rectifier bridge having alternating current terminals connected to one winding of said transformer, the other winding of said transformer being connected in series with an auxiliary capacitor for discharging said capacitive means.

11. The current-fed inverter of claim 10 with said capacitive means including two capacitors connected in series, sain other winding of said transformer being in seris with said auxiliary capacitor and said auxiliary capacitor being connected between the point common to said two capacitors and the terminal of said commutation capacitor situated at the end of said commutation bridge.

12. The current-fed inverter of claim 10 with said capacitive means including one capacitor, means being provided for discharging said one capacitor through two series-connected thyristors oriented in a sense opposite to that of said commutation diodes of said commutation bridge, said transformer winding in series with said auxiliary capacitor being connectedbetween a poinst common to said series-connected thyristos and the terminal of said commutation capacitor situated at the end of said commutation bridge.

13. The converter of claim 8 further including:
an auxiliary diode connected in seris with said switching bridge; said capacitive means including a single capacitor, said discharging means comprising two discharging thyristors, a series resonant oscillating circuit including a capacitor and an inductor inserted between said two thyristors, each of the terminals of the capacitor of said oscillating circuit being respectively connected to corresponding terminals of said auxiliary diode via corresponding additional thyristors.

* * * * *